United States Patent
Chen et al.

(10) Patent No.: US 9,960,967 B2
(45) Date of Patent: May 1, 2018

(54) DETERMINING AN APPLICATION DELIVERY SERVER BASED ON GEO-LOCATION INFORMATION

(75) Inventors: Lee Chen, Saratoga, CA (US); John Chiong, San Jose, CA (US)

(73) Assignee: A10 NETWORKS, INC., San Jose, CA (US)

(*) Notice: Subject to any disclaimer, the term of this patent is extended or adjusted under 35 U.S.C. 154(b) by 231 days.

(21) Appl. No.: 12/603,471

(22) Filed: Oct. 21, 2009

(65) Prior Publication Data

US 2011/0093522 A1    Apr. 21, 2011

(51) Int. Cl.
*H04L 12/24*    (2006.01)
*H04L 29/12*    (2006.01)
*H04L 29/08*    (2006.01)

(52) U.S. Cl.
CPC ........ *H04L 41/12* (2013.01); *H04L 29/12066* (2013.01); *H04L 61/1511* (2013.01); *H04L 67/1002* (2013.01); *H04L 67/1021* (2013.01); *H04L 67/1036* (2013.01)

(58) Field of Classification Search
CPC ............. H04L 67/1021; H04L 61/1511; H04L 29/08081; H04L 41/12
See application file for complete search history.

(56) References Cited

U.S. PATENT DOCUMENTS

| | | |
|---|---|---|
| 5,218,602 A | 6/1993 | Grant et al. |
| 5,774,660 A | 6/1998 | Brendel et al. |
| 5,862,339 A | 1/1999 | Bonnaure et al. |
| 5,875,185 A | 2/1999 | Wang et al. |
| 5,935,207 A | 8/1999 | Logue et al. |
| 5,958,053 A | 9/1999 | Denker |

(Continued)

FOREIGN PATENT DOCUMENTS

| | | |
|---|---|---|
| CN | 1372662 A | 10/2002 |
| CN | 1449618 | 10/2003 |

(Continued)

OTHER PUBLICATIONS

A10 Networks Inc., Written Opinion dated Jun. 21, 2011, PCT/US2010/052209, filed Oct. 12, 2010.

(Continued)

*Primary Examiner* — Jerry B Dennison
(74) *Attorney, Agent, or Firm* — AMPACC Law Group, LLP; Keith Kline

(57) ABSTRACT

A method and system to determine a web server based on geo-location information is disclosed. The system includes: a local DNS server coupled to a web client; a plurality of web servers; and a global load balancer coupled to the local DNS server. The global load balancer: receives a request for a web service sent by the web client, the request comprising local DNS server information; determines a geographic location for the local DNS server based on the local DNS server information; determines a web server from the plurality of web servers based on the requested web service; determines a geographic location for the determined web server; determines that the geographic location for the local DNS server matches the geographic location for the determined web server; selects the determined web server; and sends a response comprising information on the selected web server to the local DNS server.

40 Claims, 7 Drawing Sheets

(56) References Cited

U.S. PATENT DOCUMENTS

| | | | |
|---|---|---|---|
| 5,995,981 A | 11/1999 | Wikstrom |
| 6,003,069 A | 12/1999 | Cavill |
| 6,047,268 A | 4/2000 | Bartoli et al. |
| 6,075,783 A | 6/2000 | Voit |
| 6,131,163 A | 10/2000 | Wiegel |
| 6,219,706 B1 | 4/2001 | Fan et al. |
| 6,259,705 B1 | 7/2001 | Takahashi et al. |
| 6,321,338 B1 | 11/2001 | Porras et al. |
| 6,374,300 B2 | 4/2002 | Masters |
| 6,456,617 B1 | 9/2002 | Oda et al. |
| 6,459,682 B1 | 10/2002 | Ellesson et al. |
| 6,483,600 B1 | 11/2002 | Schuster et al. |
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,748,414 B1 | 6/2004 | Bournas |
| 6,772,205 B1 | 8/2004 | Lavian et al. |
| 6,772,334 B1 | 8/2004 | Glawitsch |
| 6,779,017 B1 | 8/2004 | Lamberton et al. |
| 6,779,033 B1 | 8/2004 | Watson et al. |
| 6,804,224 B1 | 10/2004 | Schuster et al. |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 * | 6/2007 | Monteiro ............... 709/245 |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 * | 3/2008 | Hayball et al. ............ 709/219 |
| 7,349,970 B2 | 3/2008 | Clement et al. |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,733,866 B2 | 6/2010 | Mishra et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,965,727 B2 | 6/2011 | Sakata et al. |
| 7,970,934 B1 | 6/2011 | Patel |
| 7,979,694 B2 | 7/2011 | Touitou et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 7,992,201 B2 | 8/2011 | Aldridge et al. |
| 8,019,870 B1 | 9/2011 | Eppstein et al. |
| 8,032,634 B1 | 10/2011 | Eppstein et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,151,019 B1 | 4/2012 | Le et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,261,339 B2 | 9/2012 | Aldridge et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,559,437 B2 | 10/2013 | Mishra et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 8,996,670 B2 | 3/2015 | Kupinsky et al. |
| 9,094,364 B2 | 7/2015 | Jalan et al. |
| 9,106,561 B2 | 8/2015 | Jalan et al. |
| 9,137,301 B1 * | 9/2015 | Dunlap ............... H04L 67/101 |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,531,846 B2 | 12/2016 | Han et al. |
| 9,602,442 B2 | 3/2017 | Han |
| 2001/0042200 A1 | 11/2001 | Lamberton et al. |
| 2001/0049741 A1 | 12/2001 | Skene et al. |
| 2002/0026515 A1 | 2/2002 | Michielsens et al. |
| 2002/0032777 A1 | 3/2002 | Kawata et al. |
| 2002/0032799 A1 | 3/2002 | Wiedeman et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0141386 A1 | 10/2002 | Minert et al. |
| 2002/0143991 A1 * | 10/2002 | Chow et al. ............... 709/245 |

(56) References Cited

U.S. PATENT DOCUMENTS

| | | |
|---|---|---|
| 2002/0178259 A1 | 11/2002 | Doyle et al. |
| 2002/0188678 A1 | 12/2002 | Edecker et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1* | 1/2003 | Hayball et al. ............... 709/245 |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0061506 A1 | 3/2003 | Cooper et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0010545 A1 | 1/2004 | Pandya |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0250059 A1 | 12/2004 | Ramelson et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0039033 A1 | 2/2005 | Meyers et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0281190 A1 | 12/2005 | McGee et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0041745 A1 | 2/2006 | Parnes |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0164978 A1 | 7/2006 | Werner et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0124502 A1 | 5/2007 | Li |
| 2007/0156919 A1 | 7/2007 | Potti et al. |
| 2007/0165622 A1 | 7/2007 | O'Rourke et al. |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0120129 A1 | 5/2008 | Seubert et al. |
| 2008/0134332 A1 | 6/2008 | Keohane et al. |
| 2008/0162679 A1 | 7/2008 | Maher et al. |
| 2008/0225722 A1 | 9/2008 | Khemani et al. |
| 2008/0228781 A1 | 9/2008 | Chen et al. |
| 2008/0250099 A1 | 10/2008 | Shen et al. |
| 2008/0253390 A1 | 10/2008 | Das et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0049198 A1 | 2/2009 | Blinn et al. |
| 2009/0070470 A1 | 3/2009 | Bauman et al. |
| 2009/0077651 A1* | 3/2009 | Poeluev ........................ 726/15 |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0285196 A1 | 11/2009 | Lee et al. |
| 2009/0288134 A1 | 11/2009 | Foottit et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0042869 A1 | 2/2010 | Szabo et al. |
| 2010/0054139 A1 | 3/2010 | Chun et al. |
| 2010/0061319 A1* | 3/2010 | Aso et al. ...................... 370/329 |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0095018 A1 | 4/2010 | Khemani et al. |
| 2010/0098417 A1 | 4/2010 | Tse-Au |
| 2010/0106833 A1 | 4/2010 | Banerjee et al. |
| 2010/0106854 A1* | 4/2010 | Kim et al. ..................... 709/238 |
| 2010/0128606 A1 | 5/2010 | Patel et al. |
| 2010/0162378 A1 | 6/2010 | Jayawardena et al. |

(56) References Cited

U.S. PATENT DOCUMENTS

| | | |
|---|---|---|
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1* | 9/2010 | Wei .................. 709/203 |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0262819 A1 | 10/2010 | Yang et al. |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1* | 12/2010 | Shukla .................. 709/219 |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0083174 A1 | 4/2011 | Aldridge et al. |
| 2011/0099403 A1 | 4/2011 | Miyata et al. |
| 2011/0099623 A1 | 4/2011 | Garrard et al. |
| 2011/0110294 A1 | 5/2011 | Valluri et al. |
| 2011/0145324 A1 | 6/2011 | Reinart et al. |
| 2011/0149879 A1 | 6/2011 | Noriega et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0209157 A1 | 8/2011 | Sumida et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0039175 A1 | 2/2012 | Sridhar et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117382 A1 | 5/2012 | Larson et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0215910 A1 | 8/2012 | Wada |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg |
| 2013/0135996 A1 | 5/2013 | Torres et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0176908 A1 | 7/2013 | Baniel et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0086052 A1 | 3/2014 | Cai et al. |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0254367 A1 | 9/2014 | Jeong et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0026794 A1 | 1/2015 | Zuk et al. |
| 2015/0039671 A1 | 2/2015 | Jalan et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0244566 A1 | 8/2015 | Puimedon |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312092 A1 | 10/2015 | Golshan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0156708 A1 | 6/2016 | Jalan et al. |
| 2016/0173579 A1 | 6/2016 | Jalan et al. |
| 2017/0048107 A1 | 2/2017 | Dosovitsky et al. |
| 2017/0048356 A1 | 2/2017 | Thompson et al. |

FOREIGN PATENT DOCUMENTS

| | | |
|---|---|---|
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 101442425 A | 5/2009 |
| CN | 101495993 A | 7/2009 |
| CN | 101682532 A | 3/2010 |
| CN | 101878663 A | 11/2010 |
| CN | 102123156 A | 7/2011 |
| CN | 102143075 A | 8/2011 |

(56) References Cited

FOREIGN PATENT DOCUMENTS

| | | |
|---|---|---|
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| EP | 1209876 | 5/2002 |
| EP | 1770915 A1 | 4/2007 |
| EP | 1885096 A1 | 2/2008 |
| EP | 02296313 A1 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| HK | 1182560 | 11/2013 |
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A1 | 8/2015 |
| IN | 3764CHENP2014 | 9/2015 |
| IN | 261CHE2014 A | 7/2016 |
| JP | H09097233 | 4/1997 |
| JP | 1999096128 | 4/1999 |
| JP | H11338836 A | 12/1999 |
| JP | 2000276432 A | 10/2000 |
| JP | 2000307324 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014-143686 | 8/2014 |
| JP | 2015507380 A | 3/2015 |
| JP | 5855663 B2 | 12/2015 |
| JP | 5906263 B | 3/2016 |
| JP | 5913609 B2 | 4/2016 |
| KR | 10-0830413 B1 | 5/2008 |
| KR | 1020130096624 | 8/2013 |
| KR | 101576585 B1 | 12/2015 |
| TW | 269763 B | 2/1996 |
| TW | 425821 B | 3/2001 |
| TW | 444478 B | 7/2001 |
| WO | 01-13228 | 2/2001 |
| WO | WO 01/14990 * | 3/2001 ............ G06F 15/16 |
| WO | WO2001045349 | 6/2001 |
| WO | WO2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2001049770 A2 | 4/2011 |
| WO | WO2011079381 A1 | 7/2011 |
| WO | 2011149796 A2 | 12/2011 |
| WO | 2012050747 | 4/2012 |
| WO | 2012075237 A2 | 6/2012 |
| WO | WO2012083264 A2 | 6/2012 |
| WO | WO2012097015 A2 | 7/2012 |
| WO | 2013070391 A1 | 5/2013 |
| WO | 2013081952 A1 | 6/2013 |
| WO | 2013096019 A1 | 6/2013 |
| WO | 2013112492 | 8/2013 |
| WO | WO2014031046 A1 | 2/2014 |
| WO | WO2014052099 | 4/2014 |
| WO | 2014088741 | 6/2014 |
| WO | 2014093829 | 6/2014 |
| WO | 2014138483 | 9/2014 |
| WO | 2014144837 | 9/2014 |
| WO | WO 2014179753 | 11/2014 |
| WO | WO2015153020 A1 | 10/2015 |
| WO | WO2015164026 A1 | 10/2015 |

OTHER PUBLICATIONS

Spatscheck et al., "Optimizing TCP Forwarder Performance", IEEE/ACM Transactions on Networking, vol. 8, No. 2, Apr. 2000.
Kjaer et al. "Resource allocation and disturbance rejection in web servers using SLAs and virtualized servers", IEEE Transactions on Network and Service Management, IEEE, US, vol. 6, No. 4, Dec. 1, 2009.
Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.
Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.
"tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=ascii>>, Nov. 25, 2007, 11 pages.
Cardellini et al., "Dynamic Load Balancing on Web-server Systems", IEEE Internet Computing, vol. 3, No. 3, pp. 28-39, May-Jun. 1999.
Goldszmidt et al. NetDispatcher: A TCP Connection Router, IBM Research Report RC 20853, May 19, 1997.
Koike et al., "Transport Middleware for Network-Based Control," IEICE Technical Report, Jun. 22, 2000, vol. 100, No. 53, pp. 13-18.
Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.
Abe et al., "Adaptive Split Connection Schemes in Advanced Relay Nodes," IEICE Technical Report, Feb. 22, 2010, vol. 109, No. 438, pp. 25-30.
"Enhanced Interior Gateway Routing Protocol", Cisco, Document ID 16406, Sep. 9, 2005 update, 43 pages.
Crotti, Manuel et al., "Detecting HTTP Tunnels with Statistical Mechanisms", IEEE International Conference on Communications, Jun. 24-28, 2007, pp. 6162-6168.
Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.
Chen, Jianhua et al., "SSL/TLS-based Secure Tunnel Gateway System Design and Implementation", IEEE International Workshop on Anti-counterfaiting, Security, Identification, Apr. 16-18, 2007, pp. 258-261.
"EIGRP MPLS VPN PE-CE Site of Origin (SoO)", Cisco Systems, Feb. 28, 2006, 14 pages.

* cited by examiner 126, 146

Examples for Geo-location

DETERMINING AN APPLICATION DELIVERY SERVER BASED ON GEO-LOCATION INFORMATION

BACKGROUND OF THE INVENTION

Field

This invention relates generally to data communications, and more specifically, to a method and system to balance web server load based on global geographic location.

Background

Web sites are known to use many web servers to serve large numbers of web clients accessing the web sites. The web servers, or application delivery servers, deliver web applications such as web pages, videos, file transfers, photo transfers, office applications, email applications, enterprise web applications and many other consumer and enterprise applications using web technologies. In a typical deployment scenario, the web servers are behind a server load balancer (SLB). The SLB receives a web service request from a web client, selects a web server, and relays the web service request to the selected web server. The network architecture using a SLB and a plurality of web servers allows not only a web site to serve many web clients, but also provides fault resiliency to a web site in case one or more web servers fail, while the remaining web servers continue to provide web services. A web site may deploy a plurality of SLB's to provide fault tolerance to one or more SLB failures. However, as a web site grows in popularity, a single or a few SLB's with a plurality of web servers may not be sufficient. Large number of SLB's and a very large number of web servers are necessary to serve a large web site such as google.com or yahoo.com.

Moreover, the large number of web servers and SLB's are hosted in a plurality of data centers, so as to provide further fault tolerance in case of data center failure. The data centers are usually far apart, with at least tens or hundreds of miles apart. When a web client accesses the web site, the web service request is assigned to a web server in one of the data centers. The quality of the web service then depends on the chosen data center, where the service quality may depend on the distance between the data center and the web client, the load of the web servers in the data center, the network capacity of the web servers in the data center to the web client, and other network or computing factors between the data center and the web client. Thus the location information of the web client becomes an important factor in selecting a data center, and in selecting a web server of the data center to serve the web service request from the web client.

It is common to use a Domain Name System (DNS) to deploy a plurality of web servers for a web service based on a Uniform Resource Locator (URL). In one embodiment, a web client sends an inquiry to a DNS server with a domain name, which is a part of the URL. A DNS server responds with a plurality of records, each of which refers to a web server. In various methods, the web client uses the plurality of records referencing the plurality of web servers to determine a particular web server, the web client selects a web server using a round robin scheme on the plurality of web servers, the web client selects a web server used in a previous web session on the same web service, or the web client selects a web server different from a previous web session on the same web service where the previous web session encountered an error.

In one method, a local DNS server assists the web client in selecting a web server. The local DNS server receives information for a plurality of web servers from a global DNS server. In one embodiment, the local DNS server selects a web server from the plurality of web servers. For example, the local DNS server selects a web server using a round robin scheme. In one method, the local DNS server selects the first web server from the plurality of web servers.

However, as mentioned above, there is no existing method to select a web server based on location information or to balance web server load based on location information, so as to provide a better web service, and to provide fault tolerance upon data center failure.

Therefore, there is a need for a system and method to balance web server load based on location information of a web client.

BRIEF SUMMARY OF THE INVENTION

The invention provides a method and system to determine a web server based on geo-location information. In a method aspect, the invention comprises: receiving a request for a web service sent by a web client, the web client being coupled to a local domain name system (DNS) server, the request comprising local DNS server information; determining a geographic location for the local DNS server based on the local DNS server information; determining a web server from a plurality of web servers based on the requested web service; determining a geographic location for the determined web server; determining that the geographic location for the local DNS server matches the geographic location for the determined web server; selecting the determined web server; and sending a response comprising information on the selected web server to the local DNS server.

In one aspect, the local DNS server information comprises an IP address for the local DNS server, wherein a server location database is queried using the IP address for the local DNS server, wherein the server location database comprises a plurality of entries, each entry comprising an IP address and a corresponding geographic location, wherein the server location database identifies one or more entries comprising an IP address matching the IP address for the local DNS server, wherein a corresponding geographic location from the identified entry is received from the server location database as the geographic location.

In one aspect, the request further comprises a domain name, wherein a web server location database is queried using the domain name, wherein the web server location database comprises a plurality of entries, each entry comprising a domain name, a corresponding web server, and a corresponding geographic location, wherein the web server location database identifies one or more entries comprising a domain name matching the domain name from the request, wherein a corresponding geographic location from the identified entry is received from the web server location database as the geographic location for the determined web server.

In a system aspect, the invention comprises: a plurality of web servers; and a global load balancer coupled to the local DNS server. The global load balancer is coupled to a local DNS server coupled to a web client, where the global load balancer: receives a request for a web service sent by the web client, the request comprising local DNS server information; determines a geographic location for the local DNS server based on the local DNS server information; determines a web server from the plurality of web servers based on the requested web service; determines a geographic location for the determined web server; determines that the geographic location for the local DNS server matches the geographic location for the determined web server; selects the determined web server; and sends a response comprising information on the selected web server to the local DNS server.

BRIEF DESCRIPTION OF THE SEVERAL VIEWS OF THE FIGURES

FIG. 1a illustrates embodiments of geo-locations.

DETAILED DESCRIPTION OF THE INVENTION

The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the invention is not intended to be limited to the embodiment shown but is to be accorded the widest scope consistent with the principles and features described herein.

Figure 1:
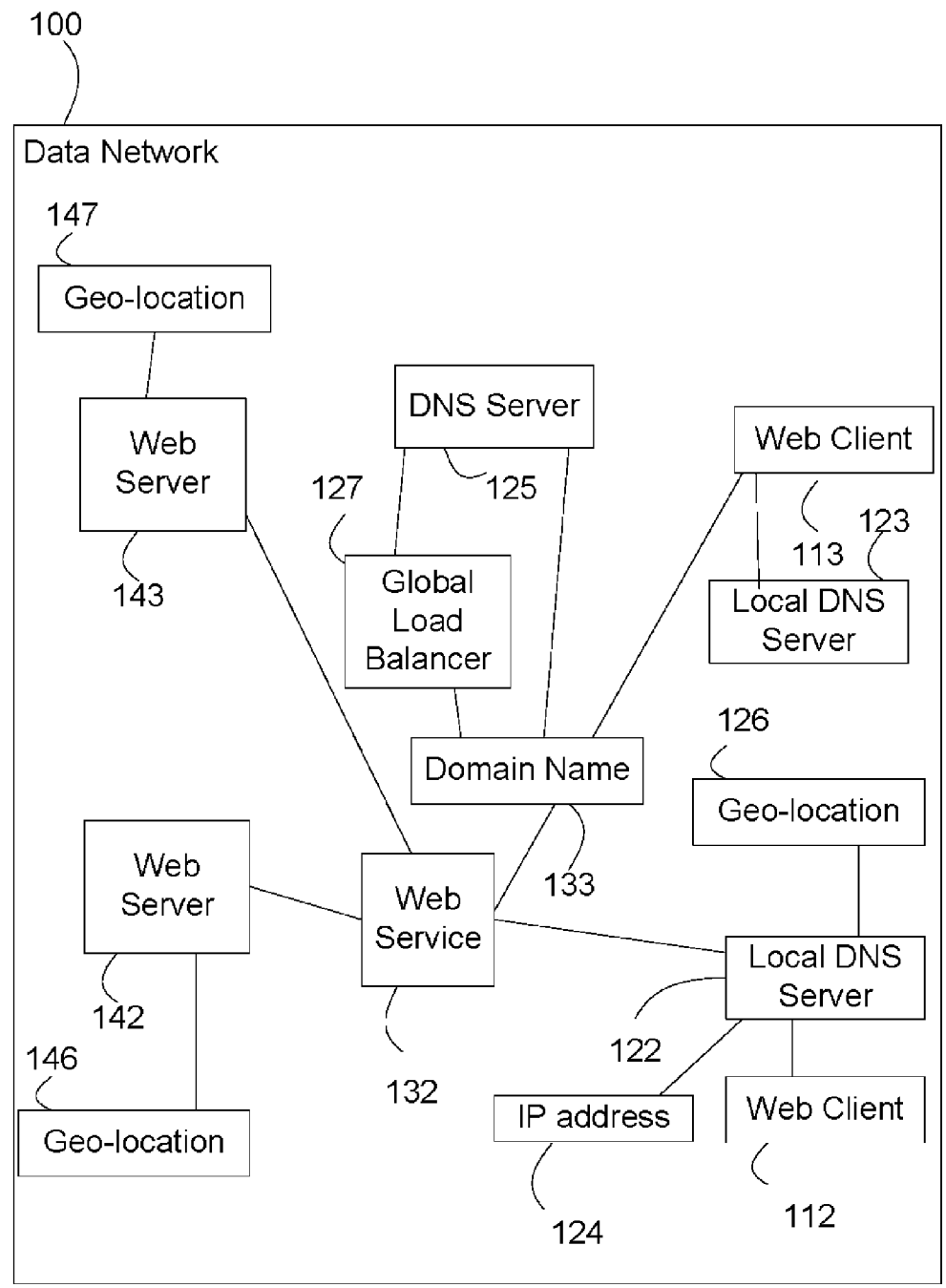
FIG. 1 illustrates a global geographic location or geo-location based web service load balancing.

FIG. 1 illustrates a global geographic location or geo-location based web service load balancing. Web service 132 is offered to web clients 112 and 113 in a global data network 100. Data network 100 includes the Internet. In one embodiment, data network 100 includes cellular data network, a General Packet Radio Service (GPRS) network, a third-generation cellular (3G) network, or a fourth-generation cellular (4G) network. In one embodiment, data network 100 includes an Internet service provider network. In one embodiment, data network 100 includes a wireless network, such as a Wi-Fi hotspot network. In one embodiment, data network 100 includes a wired network such as Ethernet. In one embodiment, data network 100 includes a corporate internal network or intranet, a virtual private network (VPN) or an extranet. In one embodiment, data network 100 includes a service provider internal network or a walled garden service network within the service provider network.

In one embodiment, web client 112 is a computing device with web access through data network 100. In one embodiment, web client 112 accesses data network 100 using Internet Protocol (IP), Hypertext Transfer Protocol (HTTP), File Transfer Protocol (FTP), Session Initiation Protocol (SIP), or any other web-based protocol. In one example, web client 112 includes a web browser, a web widget accessing data network 100, a web-based operating system accessing data network 100 using a web-based protocol. In one embodiment, web client 112 includes Google Android, Google Chrome™ or other web-based operating system. In one embodiment, web client 112 includes Microsoft Internet Explorer™, Google Chrome™, Firefox®, Apple Safari™, Opera or other web browser. In one embodiment, web client 112 is a personal computer, a notebook, a netbook, a mobile Internet device (MID), a personal digital assistant (PDA), a smartphone, a mobile phone, a media player, a mobile media player, a mobile television set, a television set, a set-top box, a net-top box, an Internet-enabled DVD player or other computing appliance with web access to data network 100.

In one embodiment, web service 132 includes a service offered by a web site or a web portal. In one embodiment, web service 132 includes a Uniform Resource Locator (URL), such as http://www.abc.com, ftp://ftp.aaa.com, https://secure.online-banking.com, www.a-web-site.com, http://www.abc.com/banner.png, https://secure.online-banking.com/?user=jonny+password=0CB56D7104. In one embodiment, web service 132 comprises domain name 133. For example, domain name 133 can be www.abc.com, ftp.aaa.com, secure.online-banking.com, www.a-web-site.com, abc.com, a-web-site.com, on-line-banking.com. In one embodiment, domain name 133 relates to the type of web service 132. In one embodiment, www.abc.com relates to HTTP service; ftp.aaa.com relates to file transfer (FTP) services; secure.online-banking.com relates to secure services.

Web server 142 serves web service 132. In one embodiment, web server 142 is a computing device servicing web service 132. In one embodiment, web server 142 includes a web server software such as Apache HTTP Server, Websphere™, Weblogic™, Internet Information Services (IIS)™, or other web server software. In one embodiment, web server 142 is a server load balancer (SLB). In one embodiment, web server 142 includes a plurality of server computers serving web service 132. In one embodiment web server 142 includes geo-location 146. In one embodiment web server 142 serves web service 132 within geo-location 146. Web server 143 also serves web service 132. In one embodiment web server 143 includes geo-location 147 and serves web service 132 within geo-location 147. In one embodiment, web servers 142 and 143 serve web service 132 in their corresponding geo-location 146 and geo-location 147 respectively. By spreading the load for serving web service 132, web servers 142 and 143 provide better services for web service 132.

In order to determine web server 142 for web service 132, web client 112 obtains domain name 133 and queries local domain name system (DNS) server 122 using domain name 133 for web server 142. Like-wise, web client 113 obtains domain name 133 and queries local DNS server 123. In one embodiment, local DNS server 122 sends domain name 133 to DNS server 125. In one embodiment, DNS server 125 determines web server 142, using domain name 133 and geo-location 126 of local DNS server 122.

In one embodiment, geo-location 126 indicates a geographic location of local DNS server 122. In one embodiment geo-location 126 includes a country such as United States, Japan, Luxemburg, or Egypt. In one embodiment geo-location 126 includes a state or province such as California of United States, or Guangzhou of China. In one embodiment geo-location 126 includes a region such as an island, a metropolitan, north-east region of United States, west coast, or a tri-city area. In one embodiment, geo-location 126 includes a city such as San Francisco, Tokyo, Beijing, Paris, or London. In one embodiment, geo-location 126 includes a district in a city such as down-town, up-town, Richmond district of San Francisco, or Chinatown of New York City. In one embodiment, geo-location 126 includes a street block, a building, a campus, or a street address. In one embodiment, geo-location 126 includes an area served by an Internet gateway, a hot-spot access point, a mobile Internet gateway, a wireless gateway, or a wireless or cellular base station. In one embodiment, geo-location 126 includes hierarchical information of locations, such as down-town district of San Francisco in California State of United States. In one embodiment, geo-location 126 includes global position information such as longitude and latitude information. In one embodiment, geo-location 126 includes height information or floor information in a building, such as 1000 feet above sea level, $3^{rd}$ floor, or basement. In one embodiment, geo-location 126 includes a neighborhood or area around a location. For example, geo-location 126 indicates $3^{rd}$ floor of a building and an area of two floors above and one floor below the $3^{rd}$ floor. In another example, geo-location 126 indicates a 5 miles area from a building or a landmark.

FIG. 1a illustrates embodiments of geo-location 126 and geo-location 146. For example, NA.US.CA.SF indicates San Francisco (SF) city of California (CA) state in United States (US) country of North America (NA) continent; NA.US.CA indicates California state in United States of North America continent; CA.LA indicates Los Angeles (LA) city of California (CA); CA.PA.DN indicates Downtown (DN) district of Palo Alto (PA) of California; NY.NY.(−73.98592, 40.74831) indicates geo-physical location of longitude −73.98592, latitude 40.74831 in New York (NY) city of New York (NY) state; AS.JP indicates Japan (JP) country of Asia (AS) continent.

In one embodiment, geo-location 126 indicates a geographic location of web client 112, which is served by local DNS server 122 for DNS services. In one scenario, web client 112 is in New York City downtown and local DNS server 122 serves DNS services for New York City. In one embodiment, geo-location 126 indicates the location of local DNS server 122. In one scenario, local DNS server 122 is located in an office in New York City downtown area. In one embodiment, geo-location 126 indicates the location of an IP gateway connecting to web client 112. In one embodiment, the IP gateway is a Digital Subscriber Line Access Multiplexer (DSLAM) located in a Central Office (CO) in New York City downtown. In these embodiments, geo-location 126 indicates New York City downtown.

After determining web server 142, DNS server 125 replies to local DNS server 122 information about web server 142. In one embodiment, the reply includes an IP address of web server 142. In one embodiment, the reply includes a host name of web server 142. In one embodiment, the reply includes an identity of web server 142. Local DNS server 122 replies to web client 112 of web server 142. Web client 112 then establishes a web session with web server 142 to process web service 132.

Since web clients 112 and 113 request web service 132 from possibly different geo-locations, it is important for the web service 132 to be served in the most efficient manner. For example, web service 132 desires to be served with the best response time. Web service 132 uses web server 142 with lower network latency to web client 112. In one embodiment, the network latency is directly correlated to the distance between web server 142 and web client 112. If web server 142 is geographically closer to web client 112 than from web server 143 to web client 112, web server 142 would have lower network latency to web client 112 than the network latency between web server 143 to web client 112. In one embodiment, web service 132 is to serve with the most security. Web service 132 will use web server 142 with better security to server web client 112. In one embodiment, web service 132 is to be served with the most bandwidth or computing resource. In one embodiment web server 142 is has more CPU capability and more network capacity, and serves web client 112 better than web server 143.

Global load balancer 127 comprises the necessary geo-location information to determine if web server 142 best serves web service 132 to web client 112. In one embodiment, global load balancer 127 includes geo-location 146 of web server 142. In one embodiment, geo-location 146 is a location where web server 142 resides. In one embodiment, web server 142 serves web client 112 in geo-location 146. In another embodiment, web server 142 may not be where it resides, but the web server 142 serves web client 112 served by local DNS server 122 in geo-location 146. In one embodiment, web server 142 has more network capacity to geo-location 146 and would serve web client 112 better. In one embodiment, web server 132 indicates a secure web service. Web server 142 has strong secure connection to geo-location 146 and would better serve web client 112.

In one embodiment, geo-location 146 relates to the country of origin of domain name 133. For example, domain name 133 being www.abc.com.cn has a country of origin of China; ftp.aaa.com.de has a country of origin of Denmark and indicates a file transfer service.

In one embodiment, DNS server 125 obtains domain name 133 from local DNS server 122. In one embodiment, DNS server 125 sends domain name 133 and information about local DNS server 122 to global load balancer 127. In one embodiment, DNS server 125 sends the IP address 124 of local DNS server 122 to global load balancer 127. In one embodiment, web server 142 comprises a plurality of servers, and the global load balancer 127 is a server load balancer balancing the load of these servers. In one embodiment, global load balancer 127 is a network device residing in data network 100. In one embodiment, global load balancer 127 is a computer or a computing server. In one embodiment, global load balancer 127 includes a software running in a network device or a computer. In one embodiment, global load balancer 127 includes storage and memory to be used in determining web server. In one embodiment, global load balancer 127 includes a network appliance or a network gateway.

Figure 2:
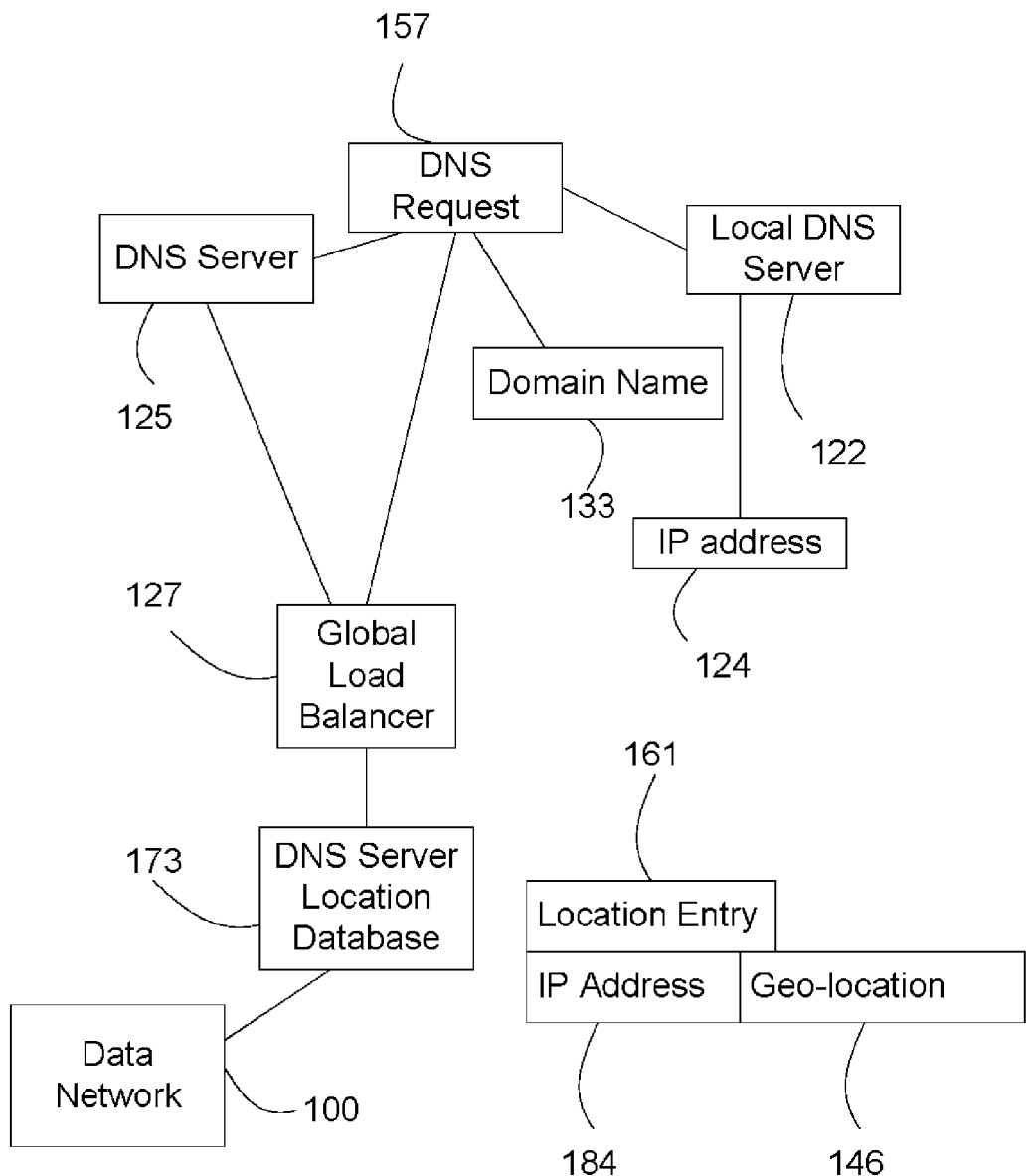
FIG. 2 illustrates a process to determine geo-location of local DNS server.

Global load balancer 127 determines geo-location 126 based on IP address 124. In one embodiment, global load balancer 127 determines geo-location 126 based on domain name 133. FIG. 2 will illustrate a process to determine geo-location 126.

Figure 3:
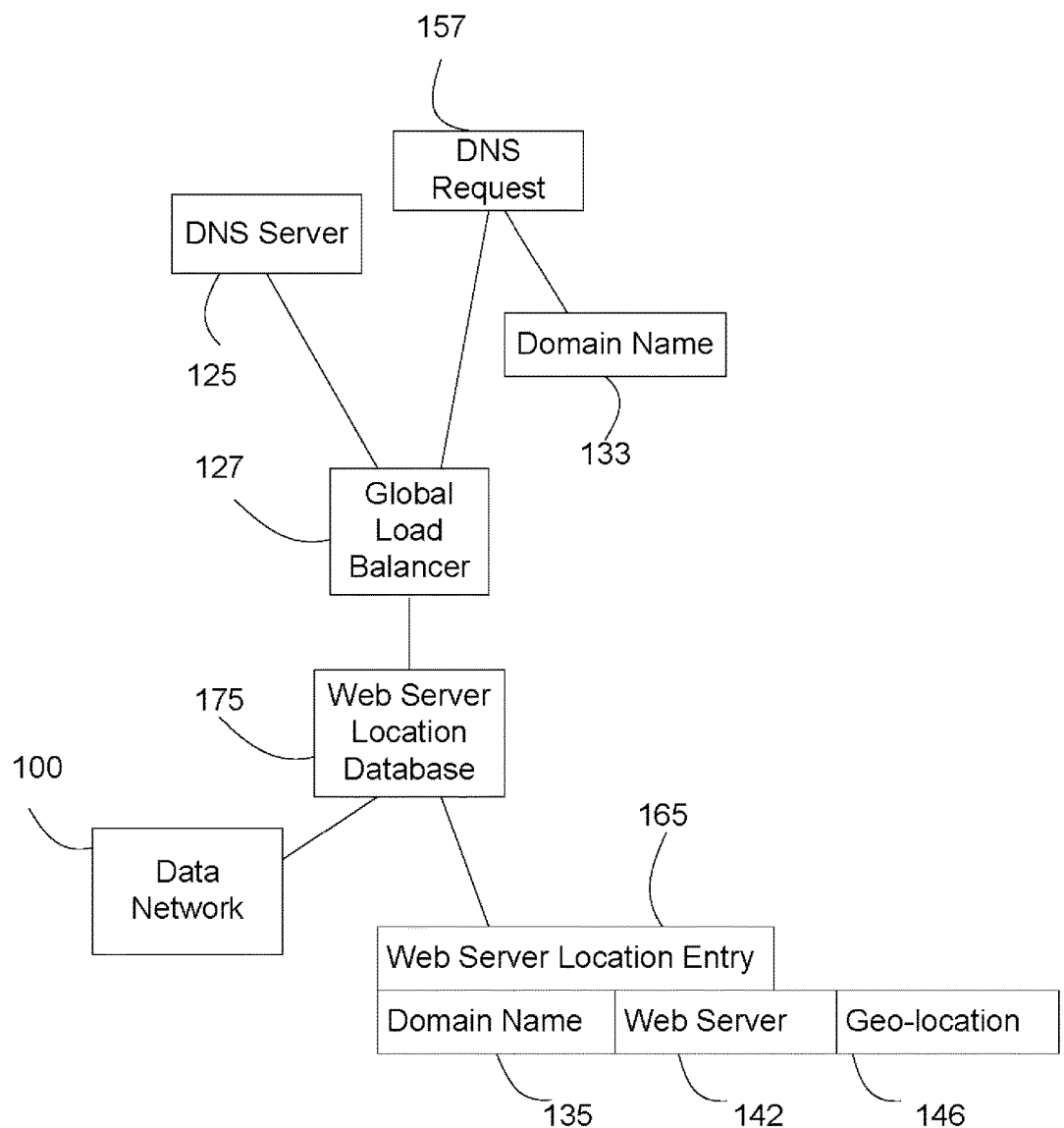
FIG. 3 illustrates a process to obtain geo-location and web server using domain name.
Figure 4:
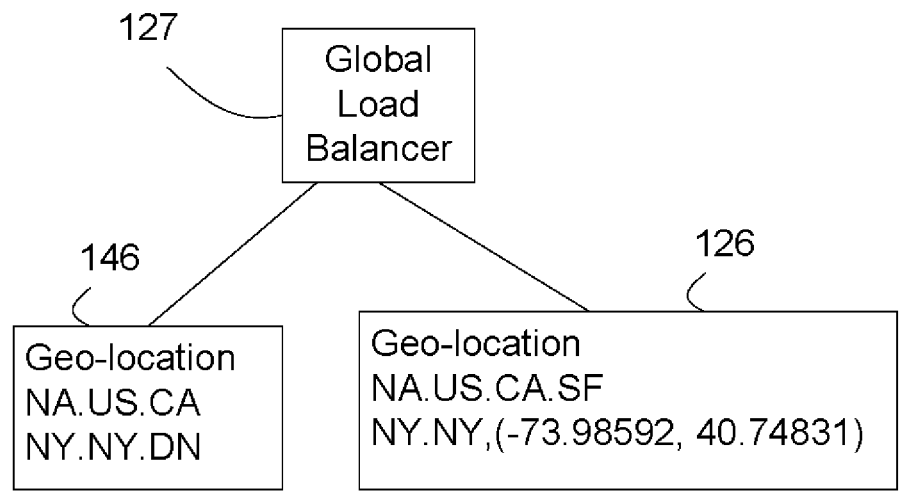
FIG. 4 illustrates a process to compare geo-location of local DNS server and geo-location of web server.

In one embodiment, global load balancer 127 obtains web server 142 based on domain name 133 such that web server 142 can serve web service 132, the web service 132 including domain name 133. Global load balancer 127 obtains geo-location 146 based on web server 142. In a later section in this specification, FIG. 3 illustrates a process to obtain web server 142 and geo-location 146. After obtaining geo-location 146, global load balancer 127 compares geo-location 146 and geo-location 126 to determine if web server 142 provides optimal service to domain name 133. FIG. 4 will illustrate a process to compare geo-location 126 and geo-location 146. If there is a match, global load balancer 127 selects web server 142. In one embodiment, global load balancer 127 responds to DNS server 125 with web server 142 to serve the web service 132. In one embodiment, global load balancer 127 responds to local DNS server 123 with web server 142.

In one embodiment, the global load balancer 127 determines there is no match between geo-location 126 and geo-location 146 and selects web server 142 using other methods. In one embodiment, global DNS server 125 selects web server 142, and the global load balancer 127 determines there is no match between geo-location 126 and geo-location 146. Global load balancer 127 then responds with web server 142 to local DNS server 123.

In one embodiment, DNS server 125 includes functionality of global load balancer 127. DNS server 125 responds to local DNS server 123 with web server 142. In one embodiment, global load balancer 127 includes functionality of DNS server 125 and responds to local DNS server 123 with web server 142. In one embodiment, global load balancer 127 intercepts the response from DNS server 125 to local DNS server 122, and alters the response to indicate web server 142 to serve domain name 133. In one embodiment, global load balancer 127 determines there is no match between geo-location 126 and geo-location 146, and does not alter the response.

In one embodiment, DNS server 125 obtains geo-location 146 of web server 142, and sends geo-location 146 to global load balancer 127. Global load balancer 127 uses geo-location 146 and domain name 133 to select web server 142. Global load balancer 127 responds to DNS server 125 with web server 142. DNS server 125 then responds to local DNS server 123 with web server 142.

FIG. 2 illustrates a process to determine geo-location 126 of local DNS server 122.

Local DNS server 122 sends a DNS request 157 to DNS server 125. In one embodiment global load balancer 127 includes the functionality of DNS server 125, and obtains DNS request 157. In one embodiment, global load balancer 127 is a network appliance between DNS server 125 and local DNS server 122. Global load balancer 127 receives DNS request 157 from data network 100. Local DNS server 122 includes IP address 124. In one embodiment IP address 124 is the host IP address of local DNS server 122 in data network 100. In one embodiment, DNS request 157 is based on Internet protocol (IP), and DNS request 157 includes IP address 124 in the IP packet header. In one embodiment, DNS request 157 includes IP address 124 in the DNS request 157 packet payload. In one embodiment, DNS request 157 includes domain name 133.

Global load balancer 127 receives DNS request 157 and obtains IP address 124. Global load balancer 127 connects to a DNS server location database 173. In one embodiment, server location database 173 is a database and global load balancer 127 uses IP address 124 to query server location database 173. DNS server location database 173 includes location entry 161 consisting of IP address 184 and geo-location 126. Server location database 173 matches IP address 124 against location entry 161 by matching IP address 124 against IP address 184. In one embodiment, IP address 184 is the same as IP address 124. For example, IP address 124 is 75.105.78.235, and IP address 184 is 75.105.78.235. In one embodiment, IP address 184 includes a range of IP addresses wherein the range of IP addresses includes IP address 124. For example IP address 184 is 75.105.78.224-255. Server location database 173 determines that IP address 124 matches IP address 184, and determines location entry 161 matches IP address 124. Global load balancer 127 obtains geo-location 126 from location entry 161. In one embodiment, DNS server location database 173 includes a storage containing location entry 161. Global load balancer 127 obtains location entry 161 from DNS server location database 173.

In one embodiment, server location database 173 includes a storage for storing location entry 161. Global load balancer 127 retrieves location entry 161 and matches IP address 124 against location entry 161. In one embodiment server location database 173 is a computing server connecting to global load balancer 127 over a data network such as data network 100. Global load balancer 127 sends a request comprising IP address 124 to server location database 173. Server location database 173 matches IP address 124 against location entry 161, and sends a response comprising location entry 161 or geo-location 126 to global load balancer 127.

FIG. 3 illustrates a process to obtain geo-location 146 and web server 142 using domain name 133.

In one embodiment, DNS server 125 sends domain name 133 to global load balancer 127. In one embodiment, global load balancer 127 obtains domain name 133 from DNS request 157.

In one embodiment, global load balancer 127 connects to a web server location database 175. Web server location database 175 includes web server location entry 165. Web server location entry 165 includes domain name 135. In one embodiment, web server location database 175 includes a storage which comprises web server location entry 165. Global load balancer 127 obtains web server location entry 165 from web server location database 175 and compares domain name 133 against domain name 135. In one embodiment, domain name 133 is www.abc.com and domain name 135 is www.abc.com and the two domain names are the same. Global load balancer 127 determines there is a match between domain name 133 and domain name 135. In one embodiment, domain name 133 is www.abc.comanddomainname135isabc.com. Domain name 133 is a sub-domain of domain name 135. Global load balancer 127 determines that there is a match between the two domain name 133 and domain name 135. In one embodiment, domain name 135 includes all domain names from www.a.com to www.i.com, where domain name 135 indicates including all domain names within the alphabetical order from www.a.com to www.i.com. Global load balancer 127 determines there is a match between domain name 133 and domain name 135. In one embodiment, web server location entry 165 includes web server 142. Global load balancer 127 obtains web server 142 from web server location entry 165.

In one embodiment, domain name 135 is www.abc.*, indicating domain name 135 includes any domain name with prefix www.abc. Global load balancer 127 determines domain name 133, being www.abc.com, has a prefix www.abc, and determines domain name 133 matches domain name 135.

In one embodiment, web server location database 175 is a computer server, and connects to global load balancer 127 via data network 100. In one embodiment, global load balancer 127 sends a request comprising domain name 133 to web server location database 175. In one embodiment web server location database 175 includes web server location entry 165. Web server location database 175 matches domain name 133 against web server location entry 165, and determines there is a match. Web server location database 175 sends web server location entry 165 to global load balancer 127. In one embodiment, web server location database 175 sends web server 142 to global load balancer 127.

In one embodiment, web server location entry 165 includes geo-location 146. Global load balancer 127 obtains geo-location 146 from web server location entry 165. In one embodiment, web server location database 175 sends geo-location 146 to global load balancer 127. In one embodiment, after global load balancer 127 receives web server 142 from web server location database 175, global load balancer 127 sends a request comprising web server 142 to web server location database 175. Web server location database 175 responds with geo-location 146. In one embodiment, after global load balancer 127 obtains web server 142, global load balancer 127 looks up web server location database 175 storage, and retrieves geo-location 146.

FIG. 4 illustrates a process to compare geo-location 126 of local DNS server 122 and geo-location 146 of web server 142.

In one embodiment, global load balancer 127 compares geo-location 126 and geo-location 146 and determines if there is a match. In one embodiment, geo-location 126 is a sub-location or sub-area of geo-location 146. In one scenario, geo-location 126 is NA.US.CA.SF and geo-location 146 is NA.US.CA. Geo-location 126 is the San Francisco city sub-area of geo-location 146 of California State. Global load balancer 127 determines there is a match. In another scenario, geo-location 126 is CA.PA.DN, or downtown district of Palo Alto city of California, and geo-location 126 is CA.PA or Palo Alto city of California. Global load balancer 127 determines there is a match. In one scenario, geo-location 126 is CA.PA.DN and geo-location 146 is CA.LA or Los Angeles city of California. Global load balancer 127 determines there is no match. In one embodiment, geo-location 126 is NY.NY,(−73.98592, 40.74831) and geo-location 146 is NY.NY.DN or downtown of New York city of New York State. Global load balancer 127 calculates the distance between the geo-location 126 and downtown of New York City, and determines that geo-location 126 is in the downtown area. Global load balancer 127 determines there is a match. In another scenario, geo-location 126 is NY.NY.(−73.98592, 40.74831) and geo-location 146 is NY.NY.(−73.994167, 40.751667; 10 miles). Global load balancer 127 calculates the distance between global positions (−73.98592, 40.74831) and (−73.994167, 40.751667) is less than 10 miles. Global load balancer 127 determines there is a match between geo-location 126 and geo-location 146.

Upon determination of a match between geo-location 126 and geo-location 146, global load balancer 127 selects web server 142 to serve web service 132, and responds to DNS server 125, or local DNS server 122.

Figure 5:
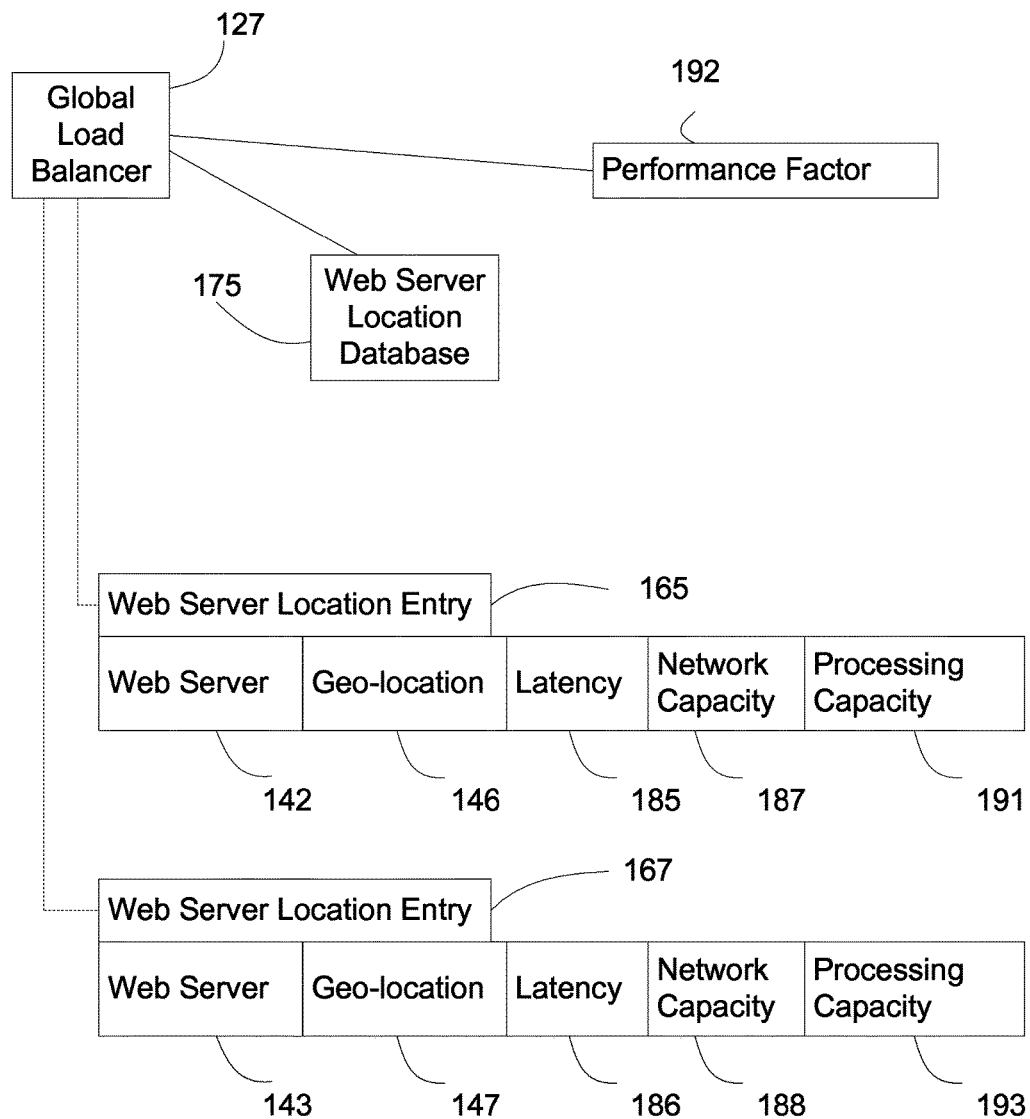
FIG. 5 illustrates a process to select web server based on additional web service performance factors.

FIG. 5 illustrates a process to select web server 142 based on additional web service performance factors.

Figure 5A:
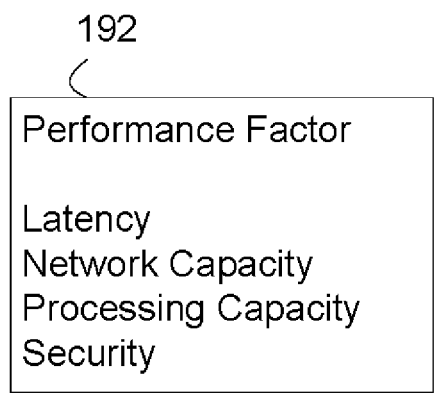
FIG. 5a illustrates several embodiments of performance factor.

In one embodiment, global load balancer 127 further selects web server 142 based on performance factor 192. FIG. 5a illustrates several embodiments of performance factor 192. In one embodiment performance factor 192 includes latency. In one embodiment web server location entry 165 includes latency 185. Latency 185 indicates a summary latency of previous web sessions between web server 142 and other web clients within geo-location 146. In one embodiment, the web sessions are related to web service 132. In one embodiment, latency 185 indicates a summary latency of previous web sessions within a period of time, such as within a week, a month, a day or last hour. In one embodiment, the period of time is the morning hours within a month.

In one embodiment web server location database 175 includes web server location entry 167 for web server 143. Web server location entry 167 includes geo-location 147 and latency 186. In one embodiment, global load balancer 127 determines there is a match between geo-location 126 and geo-location 146, and between geo-location 126 and geo-location 147. Global load balancer 127 compares latency 185 and latency 186. In one embodiment, latency 185 is smaller than latency 186. Global load balancer 127 selects web server 142. In one embodiment, web server location database 175 compares latency 185 and latency 186, and selects web server 142.

In one embodiment, web server 142 is selected to serve web service 132 to web client 112. During the web session, web server 142 determines a latency of the web session, and updates latency 185. In one embodiment, web server 142 measures the web session latency by measuring a round trip time of a network packet from web server 142 to web client 112.

In one embodiment, web server 142 measures a latency between web server 142 and local DNS server 122, by measuring a round trip time of a packet from web server 142 to local DNS server 122. In one embodiment, web server 142 obtains IP address 124 of local DNS server 122 from global load balancer 127, uses IP address 124 to communicate with local DNS server 122, and measures the round trip time.

In one embodiment, performance factor 192 includes a bandwidth or network capacity. In one embodiment, web server location entry 165 includes network capacity 187, which indicates the network capacity or bandwidth between web server 142 and data network 100. In one embodiment, network capacity 187 is based on the connection capacity between web server 142 and geo-location 146. In one embodiment, network capacity 187 is based on certain time of the day. In one example, network capacity 187 in the business hours is higher than network capacity 187 in the evening hours. In one example, network capacity 187 during lunch hours is higher than network capacity 187 during mid morning.

In one embodiment, web server location entry 167 includes network capacity 188. In one embodiment, global load balancer 127 compares network capacity 187 and network capacity 188, and determines that network capacity 187 is larger than network capacity 188. Global load balancer 127 selects web server 142. In one embodiment, web server location database 1xx compares network capacity 187 and network capacity 188 and selects web server 142.

In one embodiment, performance factor 192 includes processing capability. In one embodiment, web server location entry 165 includes processing capability 191. In various embodiments, processing capability 191 indicates the computing capability of web server 142, such as, for example, a processing speed, a number of processors web server 142 has, a memory capacity, other processing capabilities, or a combination of such processing capabilities. In one embodiment, processing capability 191 is related to geo-location 146. In one embodiment, processing capability 191 is related to a time of the day. For example, processing capability 191 is lower during business hours than during evening hours. In one example, processing capability 191 is higher in the weekend than during weekdays.

In one embodiment, web server location entry 167 includes processing capability 193. Global load balancer 127 compares processing capability 191 and processing capability 193, and selects web server 142 when processing capability 191 is better than processing capability 193. In one embodiment, processing capability 191 indicates an average processing time to serve a web session for web service 132 by web server 142. In one embodiment, processing capability 191 indicates the worst or best processing time to serve a web session for web service 132 by web server 142.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the invention has been described in accordance with the embodiments shown, one of ordinary skill in the art will readily recognize that there could be variations to the embodiments and those variations would be within the spirit and scope of the invention. Accordingly, many modifications may be made by one of ordinary skill in the art without departing from the spirit and scope of the appended claims.

What is claimed is:

1. A method for geo-location based web service load balancing by a global load balancing computer, the method comprising:

receiving by the global load balancing computer a request for a web service offered by a web site sent by a local domain name system (DNS) server to a global DNS server, the local DNS server being coupled to a web client requesting the web service, the request comprising local DNS server information and a domain name, the global load balancer being coupled between the local DNS server and the global DNS server;

determining a geographic location of the local DNS server based on the local DNS server information;

conditionally determining a web server from a plurality of web servers that serve the requested web service offered by the website based on a web server location entry from a web server location database;

determining a geographic location for the conditionally determined web server from the web server location entry;

comparing the geographic location of the local DNS server to the geographic location for the conditionally determined web server, the determining a web server that is able to serve the requested web service offered by the website from a plurality of web servers and the determining a geographic location for the conditionally determined web server comprising:

querying the web server location database using the domain name, wherein the web server location database comprises a plurality of entries, each entry comprising a domain name, a corresponding web server, and a corresponding geographic location, wherein the web server location database identifies one or more entries comprising a domain name matching the domain name from the request; and receiving from the web server location database a corresponding geographic location from the identified entry as the geographic location for the conditionally determined web server, each entry further comprising a performance factor, the performance factor comprising a latency, wherein the determining one of the corresponding web servers based on the comparison of the performance factors for the corresponding geographic locations that match the geographic location of the local DNS server comprises:

determining the corresponding web server with a smallest latency, wherein the web server location database identifies a plurality of entries comprising the domain name matching the domain name from the request, the receiving from the web server location database a corresponding geographic location from the identified entry as the geographic location for the conditionally determined web server, the determining that the geographic location of the local DNS server matches the geographic location for the conditionally determined web server, and the selecting the conditionally determined web server comprises:

receiving from the web server location database the corresponding web servers, the corresponding geographic locations, and the performance factors from the identified entries;

determining if any of the corresponding geographic locations match the geographic location of the local DNS server;

comparing the performance factors for the corresponding geographic locations that match the geographic location of the local DNS server;

determining one of the corresponding web servers based on the comparison of the performance factors for the corresponding geographic locations that match the geographic location of the local DNS server; and selecting the conditionally determined web server;

if the geographic location of the local DNS server matches the geographic location for the conditionally determined web server based on the comparing:

selecting by the global load balancer the conditionally determined web server to serve the requested web service offered by the website;

modifying a response to the request for the web service to comprise information on the selected web server, the response being sent by the global DNS server to the global load balancer; and sending the modified response to the local DNS server.

2. The method of claim 1, wherein the geographic location of the local DNS server comprises one of the following:

a geographic location at which the local DNS server resides; or a geographic location of an IP gateway connected to the web client.

3. The method of claim 1, wherein the geographic location for the conditionally determined web server comprises one of the following:

a geographic location at which the conditionally determined web server resides;

a local DNS server geographic location serviced by the conditionally determined web server; or a web client geographic location serviced by the conditionally determined web server.

4. The method of claim 1, wherein the local DNS server information comprises an IP address of the local DNS server, wherein the determining a geographic location of the local DNS server based on the local DNS server information comprises:

querying a server location database using the IP address of the local DNS server, wherein the server location database comprises a plurality of entries, each entry comprising an IP address and a corresponding geographic location, wherein the server location database identifies one or more entries comprising an IP address matching the IP address of the local DNS server; and receiving from the server location database a corresponding geographic location from the identified entry as the geographic location of the local DNS server.

5. The method of claim 4, wherein the IP address in the identified entry matches the IP address of the local DNS server when:

the IP address in the identified entry is an exact match to the IP address of the local DNS server; or the IP address of the local DNS server is within a range of IP addresses in the identified entry.

6. The method of claim 1, wherein the request further comprises a domain name, wherein the determining a web server that is able to serve the requested web service offered by the website from a plurality of web servers and the determining a geographic location for the conditionally determined web server comprises:

querying the web server location database using the domain name, wherein the web server location database comprises a plurality of entries, each entry comprising a domain name, a corresponding web server, and a corresponding geographic location, wherein the web server location database identifies one or more entries comprising a domain name matching the domain name from the request; and receiving from the web server location database a corresponding geographic location from the identified entry as the geographic location for the conditionally determined web server.

7. The method of claim 6, wherein the domain name in the identified entry matches the domain name from the request when:

the identified entry contains a domain name prefix and the domain name from the request contains the prefix; or the domain name from the request is a sub-domain of the domain name in the identified entry.

8. The method of claim 1, wherein the geographic location of the local DNS server matches the geographic location for the conditionally determined web server when:

the geographic location of the local DNS server is within a predetermined distance from the geographic location for the conditionally determined web server.

9. The method of claim 1, wherein each of the plurality of web servers comprises a plurality of server computers servicing the requested web service.

10. The method of claim 1, wherein the performance factor comprises a network capacity, wherein the determining one of the corresponding web servers based on the comparison of the performance factors for the corresponding geographic locations that match the geographic location of the local DNS server comprises:

determining the corresponding web server with a largest network capacity.

11. The method of claim 1, wherein the performance factor comprises a processing capability, wherein the determining one of the corresponding web servers based on the comparison of the performance factors for the corresponding geographic locations that match the geographic location of the local DNS server comprises:

determining the corresponding web server with a best processing capability.

12. The method of claim 1, wherein the modifying comprises:

intercepting the response to the request sent by the global DNS server to the local DNS server; and modifying the response to indicate the selected web server.

13. The method of claim 1, further comprising:

in response to determining that the geographic location of the local DNS server does not match the geographic location for the conditionally determined web server, sending the unmodified response to the local DNS server.

14. A method for geo-location based web service load balancing by a global load balancing computer, the method comprising:

receiving by the global load balancing computer a request for a web service offered by a web site sent by a local domain name system (DNS) server to a global DNS server, the local DNS server being coupled to a web client requesting the web service, the request comprising local DNS server information and a domain name, the global load balancer being coupled between the local DNS server and the global DNS server;

determining a geographic location of the local DNS server based on the local DNS server information;

conditionally determining a web server from a plurality of web servers that serve the requested web service offered by the website based on a web server location entry from a web server location database;

determining a geographic location for the conditionally determined web server from the web server location entry;

comparing the geographic location of the local DNS server to the geographic location for the conditionally determined web server, the determining a web server that is able to serve the requested web service offered by the website from a plurality of web servers and the determining a geographic location for the conditionally determined web server comprising:

querying the web server location database using the domain name, wherein the web server location database comprises a plurality of entries, each entry comprising a domain name, a corresponding web server, and a corresponding geographic location, wherein the web server location database identifies one or more entries comprising a domain name matching the domain name from the request; and receiving from the web server location database a corresponding geographic location from the identified entry as the geographic location for the conditionally determined web server, each entry further comprising a performance factor, wherein the web server location database identifies a plurality of entries comprising the domain name matching the domain name from the request, the receiving from the web server location database a corresponding geographic location from the identified entry as the geographic location for the conditionally determined web server, the determining that the geographic location of the local DNS server matches the geographic location for the conditionally determined web server, and the selecting the conditionally determined web server comprises:

receiving from the web server location database the corresponding web servers, the corresponding geographic locations, and the performance factors from the identified entries;

determining if any of the corresponding geographic locations match the geographic location of the local DNS server;

comparing the performance factors for the corresponding geographic locations that match the geographic location of the local DNS server, at least one of the performance factors comprising a network capacity;

determining one of the corresponding web servers based on the comparison of the performance factors for the corresponding geographic locations that match the geographic location of the local DNS server, and determining the corresponding web server with a largest network capacity; and selecting the conditionally determined web server;

if the geographic location of the local DNS server matches the geographic location for the conditionally determined web server based on the comparing:

selecting by the global load balancer the conditionally determined web server to serve the requested web service offered by the website;

modifying a response to the request for the web service to comprise information on the selected web server, the response being sent by the global DNS server to the global load balancer; and sending the modified response to the local DNS server.

15. The method of claim 14, wherein the geographic location of the local DNS server comprises one of the following:
  a geographic location at which the local DNS server resides; or
  a geographic location of an IP gateway connected to the web client.

16. The method of claim 14, wherein the geographic location for the conditionally determined web server comprises one of the following:
  a geographic location at which the conditionally determined web server resides;
  a local DNS server geographic location serviced by the conditionally determined web server; or
  a web client geographic location serviced by the conditionally determined web server.

17. The method of claim 14, wherein the local DNS server information comprises an IP address of the local DNS server, wherein the determining a geographic location of the local DNS server based on the local DNS server information comprises:
  querying a server location database using the IP address of the local DNS server, wherein the server location database comprises a plurality of entries, each entry comprising an IP address and a corresponding geographic location, wherein the server location database identifies one or more entries comprising an IP address matching the IP address of the local DNS server; and
  receiving from the server location database a corresponding geographic location from the identified entry as the geographic location of the local DNS server.

18. The method of claim 17, wherein the IP address in the identified entry matches the IP address of the local DNS server when:
  the IP address in the identified entry is an exact match to the IP address of the local DNS server; or
  the IP address of the local DNS server is within a range of IP addresses in the identified entry.

19. The method of claim 1, wherein the request further comprises a domain name, wherein the determining a web server that is able to serve the requested web service offered by the website from a plurality of web servers and the determining a geographic location for the conditionally determined web server comprises:
  querying the web server location database using the domain name, wherein the web server location database comprises a plurality of entries, each entry comprising a domain name, a corresponding web server, and a corresponding geographic location, wherein the web server location database identifies one or more entries comprising a
  domain name matching the domain name from the request; and
  receiving from the web server location database a corresponding geographic location from the identified entry as the geographic location for the conditionally determined web server.

20. The method of claim 19, wherein the domain name in the identified entry matches the domain name from the request when:
  the identified entry contains a domain name prefix and the domain name from the request contains the prefix; or
  the domain name from the request is a sub-domain of the domain name in the identified entry.

21. The method of claim 14, wherein the geographic location of the local DNS server matches the geographic location for the conditionally determined web server when:
  the geographic location of the local DNS server is within a predetermined distance from the geographic location for the conditionally determined web server.

22. The method of claim 14, wherein each of the plurality of web servers comprises a plurality of server computers servicing the requested web service.

23. The method of claim 22, wherein the performance factor comprises a latency, wherein the determining one of the corresponding web servers based on the comparison of the performance factors for the corresponding geographic locations that match the geographic location of the local DNS server comprises:
  determining the corresponding web server with a smallest latency.

24. The method of claim 14, wherein the performance factor comprises a processing capability, wherein the determining one of the corresponding web servers based on the comparison of the performance factors for the corresponding geographic locations that match the geographic location of the local DNS server comprises:
  determining the corresponding web server with a best processing capability.

25. The method of claim 14, wherein the modifying comprises:
  intercepting the response to the request sent by the global DNS server to the local DNS server; and
  modifying the response to indicate the selected web server.

26. The method of claim 14, further comprising:
  in response to determining that the geographic location of the local DNS server does not match the geographic location for the conditionally determined web server, sending the unmodified response to the local DNS server.

27. A method for geo-location based web service load balancing by a global load balancing computer, the method comprising:
  receiving by the global load balancing computer a request for a web service offered by a web site sent by a local domain name system (DNS) server to a global DNS server, the local DNS server being coupled to a web client requesting the web service, the request comprising local DNS server information and a domain name, the global load balancer being coupled between the local DNS server and the global DNS server;

determining a geographic location of the local DNS server based on the local DNS server information;

conditionally determining a web server from a plurality of web servers that serve the requested web service offered by the website based on a web server location entry from a web server location database;

determining a geographic location for the conditionally determined web server from the web server location entry;

comparing the geographic location of the local DNS server to the geographic location for the conditionally determined web server, the determining a web server that is able to serve the requested web service offered by the website from a plurality of web servers and the determining a geographic location for the conditionally determined web server comprising:

querying the web server location database using the domain name, wherein the web server location database comprises a plurality of entries, each entry comprising a domain name, a corresponding web server, and a corresponding geographic location, wherein the web server location database identifies one or more entries comprising a domain name matching the domain name from the request; and receiving from the web server location database a corresponding geographic location from the identified entry as the geographic location for the conditionally determined web server, each entry further comprising a performance factor, the performance factor comprising a processing capability, wherein the web server location database identifies a plurality of entries comprising the domain name matching the domain name from the request, the receiving from the web server location database a corresponding geographic location from the identified entry as the geographic location for the conditionally determined web server, the determining that the geographic location of the local DNS server matches the geographic location for the conditionally determined web server, and the selecting the conditionally determined web server comprises:

receiving from the web server location database the corresponding web servers, the corresponding geographic locations, and the performance factors from the identified entries;

determining if any of the corresponding geographic locations match the geographic location of the local DNS server;

comparing the performance factors for the corresponding geographic locations that match the geographic location of the local DNS server;

determining one of the corresponding web servers based on the comparison of the performance factors for the corresponding geographic locations that match the geographic location of the local DNS server, the determining including selecting the corresponding web server with a best processing capability; and selecting the conditionally determined web server;

if the geographic location of the local DNS server matches the geographic location for the conditionally determined web server based on the comparing:

selecting by the global load balancer the conditionally determined web server to serve the requested web service offered by the website;

modifying a response to the request for the web service to comprise information on the selected web server, the response being sent by the global DNS server to the global load balancer; and sending the modified response to the local DNS server.

28. The method of claim 27, wherein the geographic location of the local DNS server comprises one of the following:

a geographic location at which the local DNS server resides; or a geographic location of an IP gateway connected to the web client.

29. The method of claim 27, wherein the geographic location for the conditionally determined web server comprises one of the following:

a geographic location at which the conditionally determined web server resides;

a local DNS server geographic location serviced by the conditionally determined web server; or a web client geographic location serviced by the conditionally determined web server.

30. The method of claim 27, wherein the local DNS server information comprises an IP address of the local DNS server, wherein the determining a geographic location of the local DNS server based on the local DNS server information comprises:

querying a server location database using the IP address of the local DNS server, wherein the server location database comprises a plurality of entries, each entry comprising an IP address and a corresponding geographic location, wherein the server location database identifies one or more entries comprising an IP address matching the IP address of the local DNS server; and receiving from the server location database a corresponding geographic location from the identified entry as the geographic location of the local DNS server.

31. The method of claim 30, wherein the IP address in the identified entry matches the IP address of the local DNS server when:

the IP address in the identified entry is an exact match to the IP address of the local DNS server; or the IP address of the local DNS server is within a range of IP addresses in the identified entry.

32. The method of claim 27, wherein the request further comprises a domain name, wherein the determining a web server that is able to serve the requested web service offered by the website from a plurality of web servers and the determining a geographic location for the conditionally determined web server comprises:

querying the web server location database using the domain name, wherein the web server location database comprises a plurality of entries, each entry comprising a domain name, a corresponding web server, and a corresponding geographic location, wherein the web server location database identifies one or more entries comprising a domain name matching the domain name from the request; and receiving from the web server location database a corresponding geographic location from the identified entry as the geographic location for the conditionally determined web server.

33. The method of claim 32, wherein the domain name in the identified entry matches the domain name from the request when:

the identified entry contains a domain name prefix and the domain name from the request contains the prefix; or the domain name from the request is a sub-domain of the domain name in the identified entry.

34. The method of claim 27, wherein the geographic location of the local DNS server matches the geographic location for the conditionally determined web server when: the geographic location of the local DNS server is within a predetermined distance from the geographic location for the conditionally determined web server.

35. The method of claim 27, wherein each of the plurality of web servers comprises a plurality of server computers servicing the requested web service.

36. The method of claim 27, wherein each entry further comprises a performance factor, wherein the web server location database identifies a plurality of entries comprising the domain name matching the domain name from the request, wherein the receiving from the web server location database a corresponding geographic location from the identified entry as the geographic location for the conditionally determined web server, the determining that the geographic location of the local DNS server matches the geographic location for the conditionally determined web server, and the selecting the conditionally determined web server comprises:
   receiving from the web server location database the corresponding web servers, the corresponding geographic locations, and the performance factors from the identified entries;
   determining if any of the corresponding geographic locations match the geographic location of the local DNS server;
   comparing the performance factors for the corresponding geographic locations that match the geographic location of the local DNS server;
   determining one of the corresponding web servers based on the comparison of the performance factors for the corresponding geographic locations that match the geographic location of the local DNS server; and
   selecting the conditionally determined web server.

37. The method of claim 27, wherein the performance factor comprises a latency, wherein the determining one of the corresponding web servers based on the comparison of the performance factors for the corresponding geographic locations that match the geographic location of the local DNS server comprises:
   determining the corresponding web server with a smallest latency.

38. The method of claim 27, wherein the performance factor comprises a network capacity, wherein the determining one of the corresponding web servers based on the comparison of the performance factors for the corresponding geographic locations that match the geographic location of the local DNS server comprises:
   determining the corresponding web server with a largest network capacity.

39. The method of claim 27, wherein the modifying comprises:
   intercepting the response to the request sent by the global DNS server to the local DNS server; and
   modifying the response to indicate the selected web server.

40. The method of claim 27, further comprising:
   in response to determining that the geographic location of the local DNS server does not match the geographic location for the conditionally determined web server, sending the unmodified response to the local DNS server.

* * * * *